United States Patent
Kim

[11] Patent Number: 5,754,373
[45] Date of Patent: May 19, 1998

[54] HEAD DRUM ASSEMBLY HAVING A PRE-LOADING SHEET SLEEVE STRUCTURED TO FACILITATE ITS CONNECTION WITH A SHAFT AND A ROTOR PLATE AND METHOD FOR FIXING THE SAME ONTO THE SHAFT

[75] Inventor: Keum-Mo Kim, Seoul, Rep. of Korea

[73] Assignee: Daewoo Electronics Co., Ltd., Seoul, Rep. of Korea

[21] Appl. No.: 594,924

[22] Filed: Jan. 31, 1996

[30] Foreign Application Priority Data

Mar. 29, 1995 [KR] Rep. of Korea ............... 95-5854

[51] Int. Cl.$^6$ ........................................ G11B 5/52
[52] U.S. Cl. ........................................ 360/107
[58] Field of Search ........................ 360/107, 109

[56] References Cited

U.S. PATENT DOCUMENTS

| | | | |
|---|---|---|---|
| 4,564,876 | 1/1986 | Takahashi et al. | 360/107 |
| 4,959,740 | 9/1990 | Nishikawa | 360/107 |
| 4,992,900 | 2/1991 | Schalk | 360/107 |
| 5,486,966 | 1/1996 | Ahn | 360/107 |
| 5,504,642 | 4/1996 | Kinjo et al. | 360/109 |

*Primary Examiner*—Stuart S. Levy
*Assistant Examiner*—Brian E. Miller
*Attorney, Agent, or Firm*—Anderson Kill & Olick, P.C.

[57] ABSTRACT

A head drum assembly is provided with a flange fixed around a rotating shaft and including an upper abutment stopper for preventing an inner ring of an upper ball bearing from moving up with respect to the rotating shaft and a pre-loading sleeve having a sleeve portion fixed around the rotating shaft in a press-fit relationship therewith, the sleeve portion having a lower abutment stopper for pre preventing an inner ring of a lower ball bearing from moving down with respect to the rotating shaft.

2 Claims, 4 Drawing Sheets

HEAD DRUM ASSEMBLY HAVING A PRE-LOADING SHEET SLEEVE STRUCTURED TO FACILITATE ITS CONNECTION WITH A SHAFT AND A ROTOR PLATE AND METHOD FOR FIXING THE SAME ONTO THE SHAFT

FIELD OF THE INVENTION

The present invention relates to a head drum assembly for use in a video cassette recorder; and, more particularly, to a pre-loading sleeve capable of pre-loading a ball bearing installed within a head drum assembly with an increased ease, an improved reliability and at a reduced cost.

DESCRIPTION OF THE PRIOR ART

In FIG. 1, there is shown one of the prior art head drum assemblies. The illustrated head drum assembly 100 is a type including a rotating shaft 10, a rotational drum 20 equipped with a video head 21, and a flange drum 30 fixed to the rotational drum 20 into which the rotating shaft 10 is closely fitted. The rotating shaft 10 is rotatably supported by a pair of ball bearings, i.e., an upper ball bearing 45 and a lower ball bearing 46, with respect to a stationary drum 40.

Each of the ball bearings, e.g., the upper ball bearing 45, is made of three parts, namely, an inner ring 45c, a plurality of balls 45b and an outer ring 45a, and there exists a clearance between the inner ring 45c and the balls 45b and between the balls 45b and the outer ring 45a, respectively. In such a ball bearing, in order for the rotating shaft 10 to rotate precisely, the clearance therebetween must be made as small as possible, and this is known as a pre-loading of the ball bearing.

The illustrated head drum assembly 100 employs a protuberance 31 formed on a flange 30 and a pre-loading boss 50 in pre-loading the two ball bearings 45 and 46. The pre-loading boss 50 is fixed to a rotor plate 60 by a plurality of bolts 52. The pre-loading boss 50 is further fixed to the rotating shaft 10 in such a manner that a plurality of set-screws 53 depress a surface of the rotating shaft 10.

In such prior art head drum assembly 100 described above, however, there is a likelihood of the pre-loading boss 50 getting deformed, caused by a force required in setting the plurality of set-screws 53 onto the rotating shaft 10 to fix the pre-loading boss 50 about the rotating shaft 10 in such way that there is no slippage between the pre-loading boss 50 and the rotating shaft 10. The deformation of the pre-loading boss 50 causes an unwanted vibration of the head drum assembly 100 during an operation thereof.

Furthermore, to avoid the deformation of the pre-loading boss, the latter has to be made of a material having a relatively high intensity, e.g., brass which may, in turn, increase the manufacturing cost of the head drum assembly.

SUMMARY OF THE INVENTION

It is, therefore, a primary object of the invention to provide a pre-loading sleeve capable of pre-loading a ball bearing installed within a head drum assembly with an increased ease, an improved reliability and at a reduce cost.

The above and other objects of the invention are accomplished by providing a head drum assembly of having an upper and a lower ball bearing, each of the ball bearings having an inner ring, a plurality of balls and an outer ring, and a rotating shaft rotatably supported through the upper and the lower ball bearings with respect to a stationary drum, the head drum assembly comprising: a flange fixed around the rotating shaft and including an upper abutment stopper for preventing the inner ring of the upper ball bearing from moving up with respect to the rotating shaft; and a pre-loading sleeve including a sleeve portion fixed around the rotating shaft in a press-fit relationship therewith, the sleeve portion having a lower abutment stopper for preventing the inner ring of the lower ball bearing from moving down with respect to the rotating shaft.

BRIEF DESCRIPTION OF THE DRAWINGS

The above and other objects and features of the instant invention will become apparent from the following description of preferred embodiments, when given in conjunction with the accompanying drawings, in which.

DETAILED DESCRIPTION OF THE PREFERRED EMBODIMENTS

Figure 1:
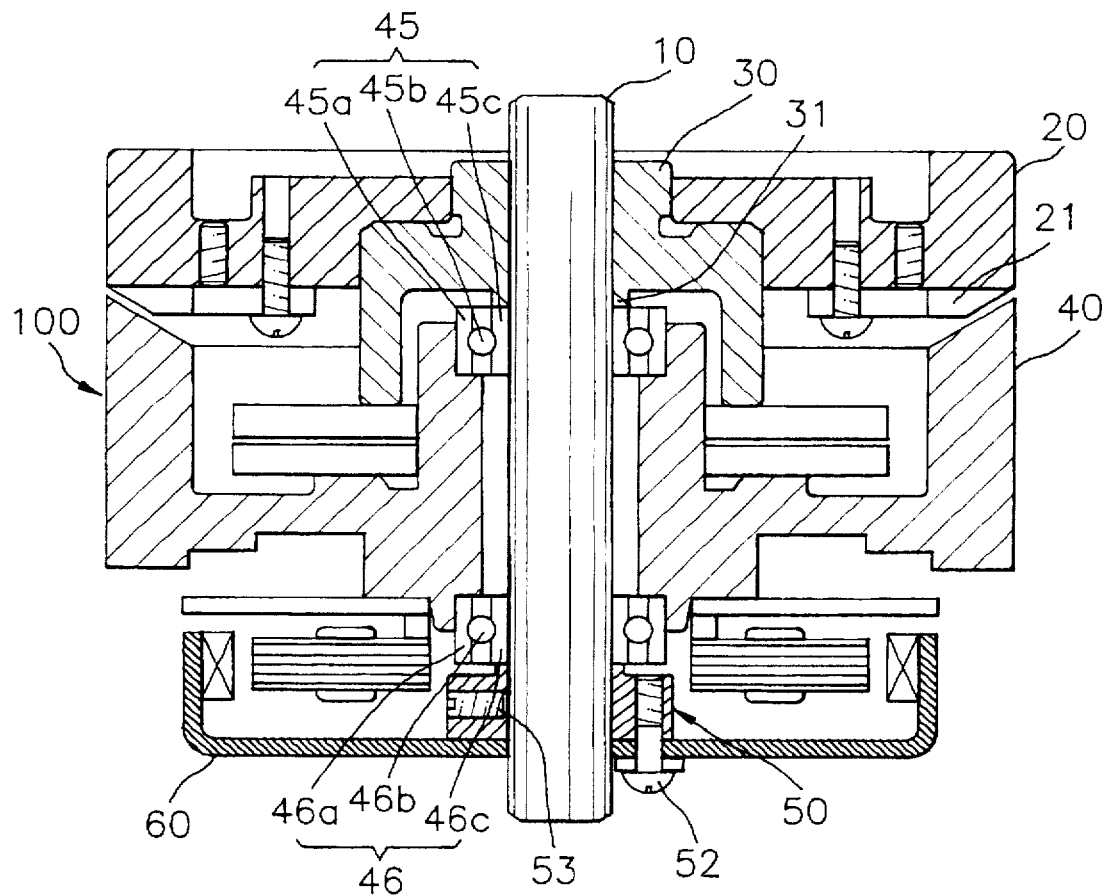
FIG. 1 shows a longitudinal sectional view of a head drum assembly employing a prior art pre-loading boss.
Figure 2:
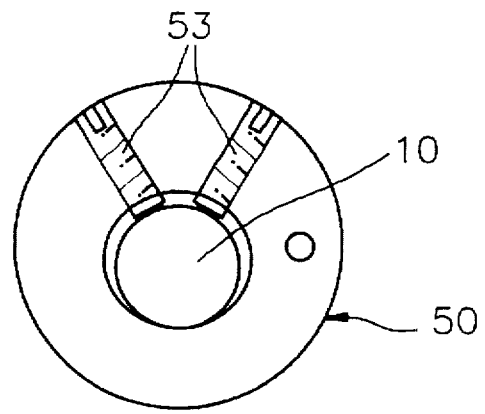
FIG. 2 represents a sectional plan view of the pre-loading boss in FIG. 1.
Figure 3:
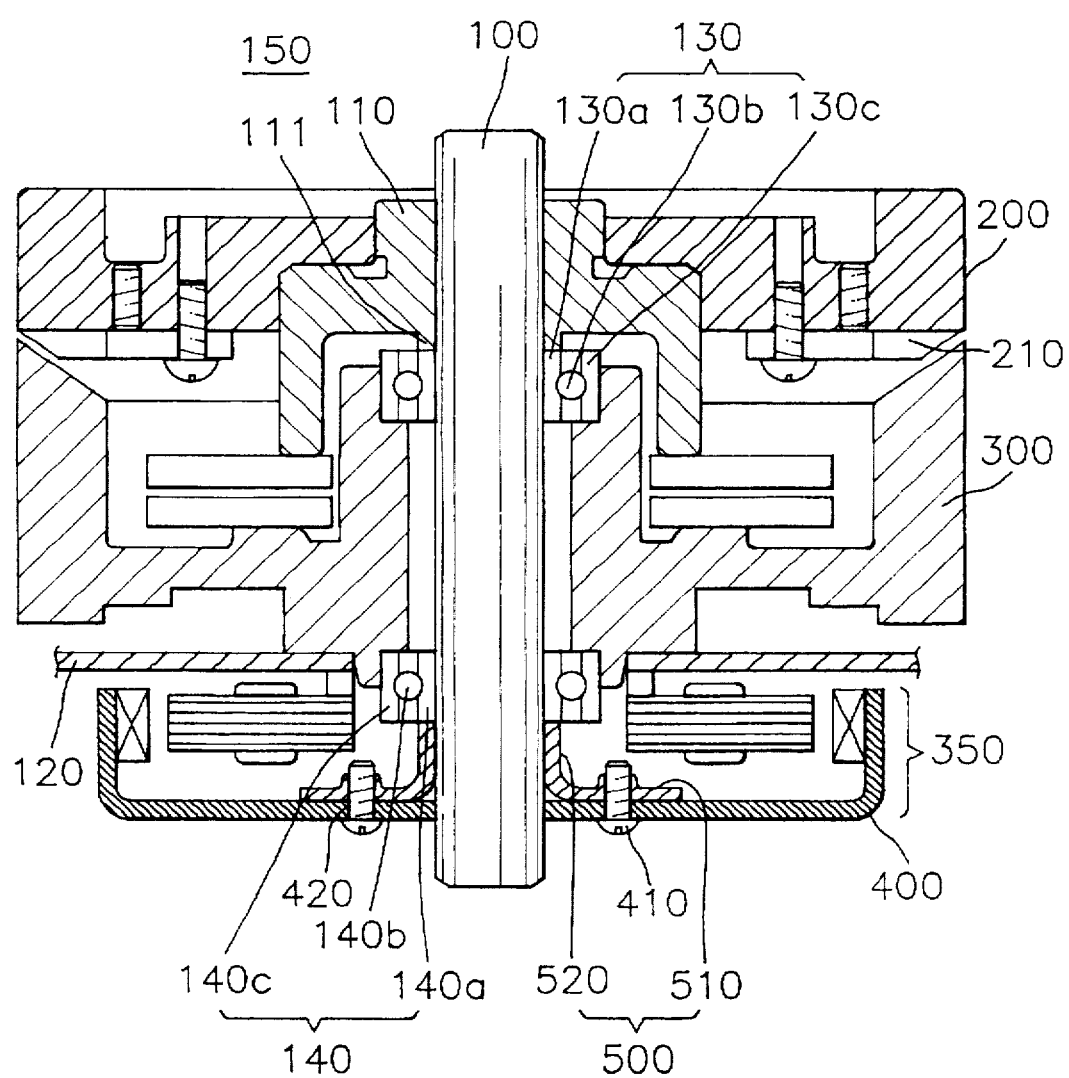
FIG. 3 illustrates a longitudinal sectional view of a head drum assembly incorporated therein an inventive pre-loading sleeve in accordance with a first embodiment of the present invention.

Referring FIG. 3, an inventive head drum assembly 150 is provided with rotating bodies including a rotating shaft 100, a flange 110 fixed around the rotating shaft 100 in a press-fit relationship therewith, and a rotational drum 200 fixed to the flange 110. A pair of ball bearings, i.e., an upper ball bearing 130 and a lower ball bearing 140, are used to rotatably support the rotating bodies 100, 110 and 200 with respect to a stationary drum 300 secured on a deck 120. Each of the ball bearings, e.g., 130, is made of three parts, namely, an inner ring 130a, a plurality of balls 130b and an outer ring 130c, and there exists a clearance between the inner ring 130a and the balls 130b and between the balls 130b and the outer ring 130c, respectively. In accordance with the present invention, in order to reduce the clearances contained in the pair of ball bearings 130 and 140, the inner rings 130a, 140a are urged toward each other, leaving the pair of ball bearings 130, 140 in "a pre-loaded condition". A protuberance 111 downwardly formed from the flange 110 and a pre-loading sleeve 500 fixed around the rotating shaft 100 are used to force the pair of ball bearings 130, 140 into the pre-loaded condition.

The protuberance 111 of the flange 110 serves as an upper abutment stopper for preventing the inner ring 130a of the upper ball bearing 130 from moving up with respect to the rotating shaft 100.

The pre-loading sleeve 500 is installed within a driving motor 350 positioned around a lower part of the rotating shaft 100. The pre-loading sleeve 500 is provided with a press-fit sleeve 520 having an abutment with the low inner ring 140a in order to prevent the low inner ring 140a from moving down with respect to the rotating shaft 100. The pre-loading sleeve 500 is also provided with a rotor plate connection 510 extending from the press-fit sleeve 520. The pre-loading sleeve 500 is normally manufactured by pressing a galvanized sheet iron into a desired shape. However, the pre-loading sleeve 500 can be also made of aluminum or plastic by using an injection molding method.

As a first preferred embodiment of the present invention, the rotor plate connection 510 is fixed to a rotor plate 400 of the driving motor 350 by threads 410. A plurality of through-holes 400 for the thread 410 are arranged on the rotor plate 400 in a radial manner. As a preferred form, a self-tapping screw can be used as the thread 410, eliminating a number of preparatory processes, for example, drilling and tapping needed to shape a thread-hole on the rotor plate connection 510, since the latter 510 is in a sheet metal from.

The press-fit sleeve 520 is fixed to the rotating shaft 100 in a press-fit relationship therewith. In fixing it to the rotating shaft 100, the press-fit sleeve 520 is first heated, causing its diameter to expand, is positioned around the rotating shaft 100 and is then cooled, causing its diameter to contract to its original dimension. Because the inventive pre-loading sleeve 500 is fixed to the rotating shaft 100 in such press-fit manner, it can be fixed to the rotating shaft 100 without a set-screw or the like.

Figure 4:
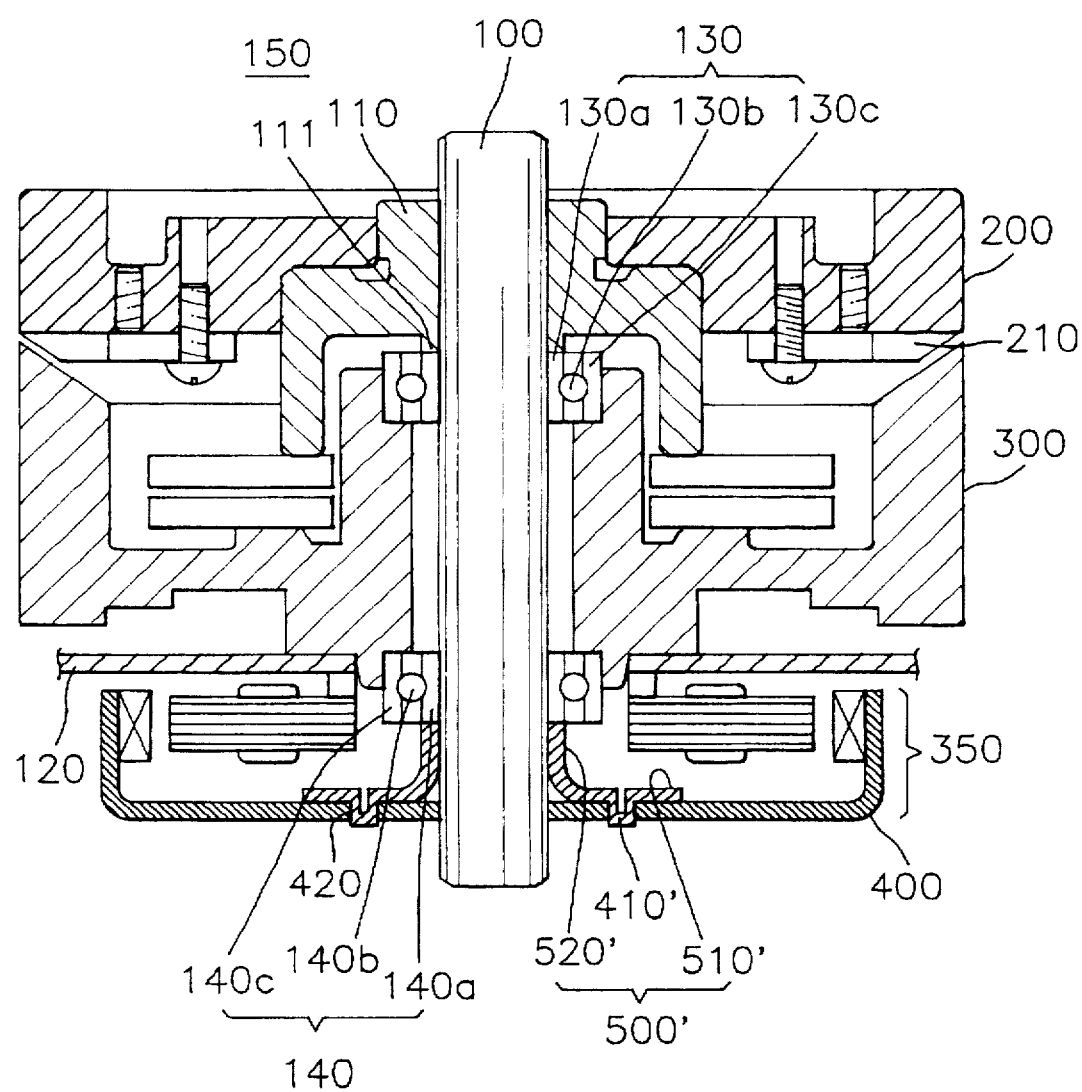
FIG. 4 offers a longitudinal sectional view of a head drum assembly employing therein an inventive pre-loading sleeve in accordance with a second embodiment of the present invention.
Figure 5:
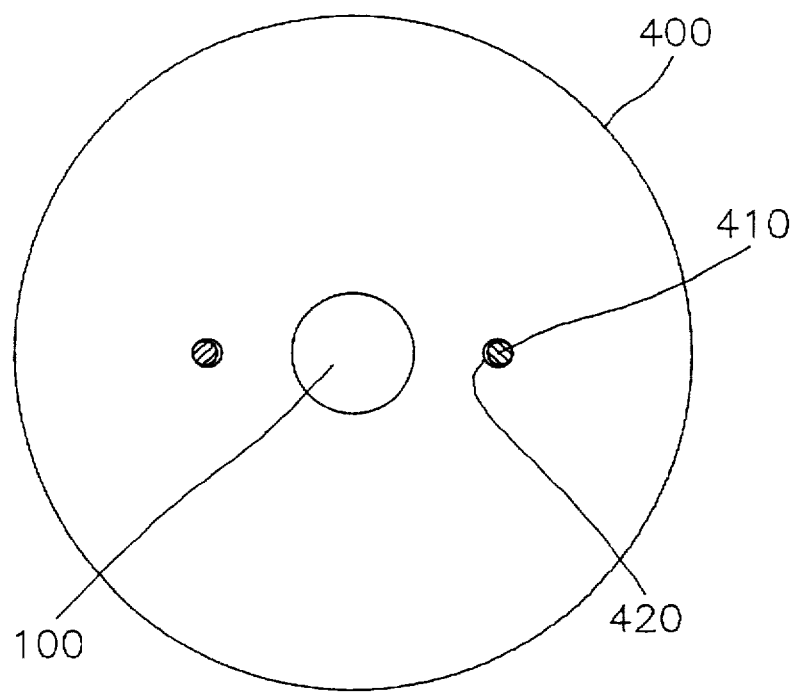
FIG. 5 presents a bottom view of a rotor plate shown in FIG. 4.

There is shown in FIG. 4, a second embodiment 500' of the inventive pre-loading sleeve. In the second embodiment, the rotor plate connection 510' is fixed to the rotor plate 400 by a pair of lugs 410' protruding through the through-holes 420. The pair of lugs 410' downwardly extend from the corresponding portions of the rotor plate connection 510' to the through-holes 420. Each of the lugs 410' is in at least a partial press-fit relationship with the through-hole 420. To ensure the fixing of the rotor plate connection 510 to the rotor plate 400, a separation between the lugs 410' is made larger than that of the through-holes 420. An inserting operation of the lug 410' into the through-hole 420 is proceeded after the rotor plate 400 is heated, thereby increasing the separation between the through-holes 420. Through this operation, the lug 410' is enable to maintain at least partial press- fit relationship with the through-hole 420, as shown in FIG. 5. It can be understood that the rotor plate connection 510 is fixed to the rotor plate 400 without fail, even if the diameter of the lug 410' is relatively smaller than that of the through-hole 420.

Figure 6:
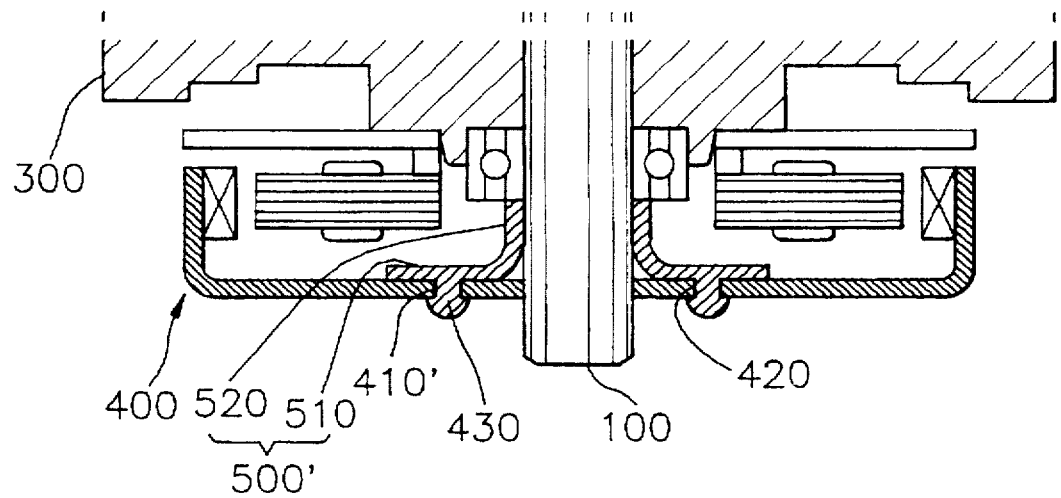
FIG. 6 is a sectional view of modification of the second embodiment.

In FIG. 6, a modification of the second embodiment of the inventive pre-loading sleeve is illustrated. In the modification, the lug 410' has a round head 430, wherein the round head 430 is shaped at a protruding portion in the lug 410' out of the through-hole 420 after the inserting operation of the lug 410' into the rotor plate 400. In order to avoid the lug's departing from the through-hole 420, the round head 430 has a substantially larger diameter than that of the through-hole 420. Since the second embodiment and its modification do not require the use of threads, it leads to a pre-loading sleeve having reduced components.

Although the invention has been shown and described with respect to the preferred embodiments, it will be understood by those skilled in the art that various changes and modifications may be made without departing from the spirit and scope of the invention as defined in the following claims.

What is claimed is:

1. A head drum assembly of having an upper and a lower ball bearing, each of the ball bearings having an inner ring, a plurality of balls and an outer ring, and a rotating shaft rotatably supported through the upper and the lower ball bearings with respect to a stationary drum, the head drum assembly comprising:

a flange fixed around the rotating shaft and including an upper abutment stopper for preventing the inner ring of the upper ball bearing from moving up with respect to the rotating shaft;

a pre-loading sheet sleeve including a sheet sleeve portion fixed around the rotating shaft in a press-fit relationship therewith, the sheet sleeve portion having a lower abutment stopper for preventing the inner ring of the lower ball bearing from moving down with respect to the rotating shaft; and an extension plate portion downwardly extending from the sheet sleeve portion and having a plurality of lugs protruding therefrom, the extension plate fixed to a rotor plate of a driving motor by keeping the lugs within a same number of through-holes, radially formed through the rotor plate, as that of the lugs with at least partial press-fit relationship between each of the lugs and the corresponding through-hole thereto.

2. The head drum assembly of claim 1, wherein a protruding part in the lug out of the through-hole has a larger diameter than that of the through-hole to thereby prevent a downward slip of the rotor plate with respect to the extension plate portion.

* * * * *

UNITED STATES PATENT AND TRADEMARK OFFICE
CERTIFICATE OF CORRECTION

PATENT NO. : 5,754,373
DATED : May 19, 1998
INVENTOR(S) : Keum-Mo Kim

It is certified that error appears in the above-indentified patent and that said Letters Patent is hereby corrected as shown below:

Column 4, Line 42 change "in the lug out of" to -- of the lug over --

Signed and Sealed this

Twenty-eighth Day of July, 1998

Attest:

BRUCE LEHMAN

*Attesting Officer*  *Commissioner of Patents and Trademarks*